2,973,383
Patented Feb. 28, 1961

2,973,383

ORGANOSILICON CARBAMYL COMPOUNDS AND PROCESS FOR PRODUCING THE SAME

William T. Black, White Plains, N.Y., assignor to Union Carbide Corporation, a corporation of New York No Drawing. Filed Dec. 26, 1957, Ser. No. 705,117

20 Claims. (Cl. 260—448.2)

The present invention relates to organosilicon compounds and to processes for their production. More particularly, this invention is concerned with organosilicon compounds containing among other possible functional groups, a carbamyl group (i.e. the

group) or substituted carbamyl group which is linked to a silicon atom through a polymethylene chain containing at least two carbon atoms, or through an alkyl substituted polymethylene chain of the same length, as new compositions of matter. The invention is also concerned with processes for producing said organosilicon compounds and with uses thereof.

The present application is a continuation in part of patent application S.N. 615,516, filed on October 12, 1956, now abandoned.

The present invention is based, in part, upon my discovery that silicon compounds containing a carbamyl group or substituted carbamyl group attached to a silicon atom through a polymethylene linkage or an alkyl substituted polymethylene linkage that contains at least two carbon atoms can be produced by the reaction of an organosilicon compound containing a carboxyalkylsilyl group (i.e. a

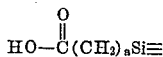

grouping wherein (*a*) is an integer that has a value of at least 2 and is preferably from 2 to 4, as well as the ester, and acid halide derivatives thereof) or an alkyl substituted carboxyalkylsilyl grouping (i.e. a

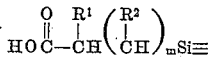

grouping wherein (*m*) is an integer that has a value of at least 1, and preferably from 1 to 3, as well as the ester, and acid halide derivatives thereof and wherein R¹ and R² are either an alkyl group or a hydrogen atom) with a nitrogen compound, as for example ammonia, a primary amine or a secondary amine, as represented by the following equations:

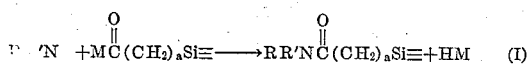 (I)

wherein (*a*) has a value of at least 2, R represents either hydrogen, alkyl, aryl or a nitro-, hydroxy-, alkoxy-, carboxy-, or carbalkoxy-substituted alkyl or aryl group, R' represents an alkyl, aryl or a nitro-, hydroxy-, carboxy-, carbaryloxy-or carbalkoxy-substituted alkyl or aryl group, M represents either halogen, hydroxyl, alkoxy or an aryloxy group, and the silicon atom is connected to at least one member of the class consisting of an alkoxy group and silicon through silicon to oxygen to silicon linkage and remaining unfilled valences of silicon being satisfied by no other groups than akyl, aryl, alkoxy and silicon through silicon to oxygen to silicon linkage.

The above equation indicates a linear polymethylene chain where the carbamyl group is attached to silicon through an alkyl substituted polymethylene linkage, the reaction may be represented by the following equation:

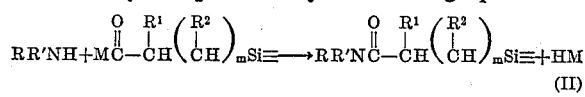 (II)

wherein (*m*), R, R', R¹, R² and M have the above defined meanings.

I have found that suitable monomeric organosilicon starting materials for my process are the ester derivatives of the carboxylalkylalkoxysilanes. Typical of such ester derivatives of carboxyalkylalkoxysilanes are those compounds represented by the structural formula:

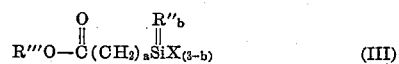 (III)

wherein R" represents an alkyl group such as the methyl, ethyl, propyl and butyl groups and the like, or an aryl group such as the phenyl, naphthyl and tolyl groups and the like, R'" represents an alkyl or aryl group as R", and includes organic substituted alkyl and aryl groups, X represents an alkoxy group such as the methoxy, ethoxy and propoxy groups and the like, (*a*) is an integer having a value of at least 2 and preferably a value of from 2 to 4, (*b*) is an integer having a value of from 0 to 2 and preferably a value of from 0 to 1. Illustrative of such substituted alkylalkoxysilanes are beta-carbethoxyethyltriethoxysilane, gamma-carbophenoxypropylmethyldiethoxysilane, gamma - carbethoxypropylethyldiethoxysilane, beta-carbethoxyethylphenyldiethoxysilane, delta-carbethoxybutyltriethoxysilane, delta-carbethoxybutylmethyldiethoxysilane, delta-carbethoxybutylethyldiethoxysilane, delta-carbethoxybutylphenyldiethoxysilane, beta-carbethoxypropylmethyldiethoxysilane, beta-carbethoxypropyltriethoxysilane, beta-carbethoxypropyldimethylethoxysilane, and the like.

According to my studies the reaction represented by Equations I and II is a general one and is applicable to all organopolysiloxane compounds which contain the carboxyalkylsilyl grouping depicted above, as well as the corresponding ester, and acid halide derivatives thereof including copolymeric materials which contain both carboxyalkylsiloxane units, or the ester, and acid halide derivatives thereof, and hydrocarbonsiloxane units.

Typical of the carboxyalkylpolysiloxanes and the ester and acid halide derivatives thereof suitable for use as my organosilicon starting materials are those polysiloxanes which contain the structural unit:

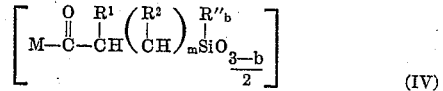 (IV)

wherein M, R", (*b*), R¹, R², and (*m*) have the same values described above. Such polysiloxanes can be prepared by processes which usually include the hydrolysis and condensation of an ester of a carboxyalkylakoxysilane, as for example a carbalkoxyalkylalkoxysilane, or by the co-hydrolysis and co-condensation of such esters with other hydrolyzable silanes. There results or is produced, depending on the hydrolysis method employed, either the carbalkoxyalkylpolysiloxane or the corresponding carboxyalkylpolysiloxane. The acid halide polysiloxane starting materials can be prepared by the reaction of a thionyl halide, such as thionyl chloride, with a carboxyalkylpolysiloxane.

As depicted by the above structural unit, our starting polysiloxanes can be of the trifunctional variety (i.e. where *b*=0) or of the difunctional variety (i.e. where *b*=1) as well as of the monofunctional variety (i.e. where *b*=2). Various types of polysiloxanes are described in detail below and while such varieties of polysiloxanes are hereinafter fully discussed with respect to an ester derivative of a carboxyalkypolysiloxane, namely a carbalkoxyalkylpolysiloxane, it is to be understood, that other polysiloxanes within the formulae depicted above, as well as the formulae depicted below, as for example the carboxyalkylpolysiloxanes and their corresponding acid halide derivatives can be also employed.

The trifunctional polysiloxanes suitable for use in the subject process may be more specifically depicted as containing the structural unit:

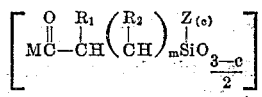
(V)

wherein M, $R^1$, $R^2$, and ($m$) have the values previously defined, Z represents a hydroxyl and/or an alkoxy group and ($c$) is a number having a value of from 0 to 1 and can be as high as 2, but is preferably from 0.1 to 1. Carbalkoxyalkylpolysiloxanes of this variety, which are essentially free of silicon-bonded alkoxy and hydroxy groups (i.e. where $c=0$) can be prepared by processes which provide for the complete hydrolysis and condensation of the alkoxy groups of a carbalkoxyalkyltrialkoxysilane, but which processes essentially prevent, or limit to a minimum, the hydrolysis of the carbalkoxy group. Illustrative of such carbalkoxyalkylpolysiloxanes are beta-carbethoxyethylpolysiloxane, beta-carbopropoxyethylpolysiloxane, gamma-carbethoxypropylpolysiloxane, beta-carbethoxypropylpolysiloxane and the like. The starting carbalkoxyalkylpolysiloxanes which contain silicon-bonded hydroxyl groups are prepared by a procedure somewhat similar to those described above with the exception that only partial condensation of the hydrolyzed alkoxy groups is effected. Those starting polysiloxanes which contain silicon-bonded alkoxy groups may also be prepared by a procedure somewhat similar to those described above with the exception that hydrolysis is conducted with an amount of water insufficient to hydrolyze all of the alkoxy groups present on the hydrolyzable monomer.

Suitable starting difunctional polysiloxanes include the cyclic and linear polymers which can be more specifically defined by the structural formula:

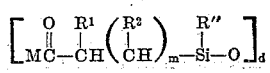
(VI)

wherein M, R″, $R^1$, $R^2$, and ($m$) have the values previously defined and ($d$) is an integer having a value of at least 3 and can be as high as 7 for the cyclic polysiloxanes and higher for the linear polysiloxanes. Such cyclic and linear polysiloxanes can be prepared by processes which provide for the hydrolysis and condensation of the alkoxy groups of a carbalkoxyalkyl-alkyldialkoxysilane or carbalkoxyalkylaryldialkoxysilane, but which processes essentially prevent or limit to a minimum the hydrolysis of the carbalkoxy groups. In carrying out the hydrolysis and condensation procedures, there is produced a hydrolyzate comprising a mixture of cyclic and linear polysiloxanes from which the desired polysiloxane can be recovered. Illustrative of the cyclic carbalkoxyalkylpolysiloxanes suitable for use in my process are the cyclic tetramer of beta-carbethoxyethylmethylsiloxane, the cyclic tetramer of gamma-carbethoxypropylethylsiloxane, the cyclic pentamer of delta-carbethoxybutylphenylsiloxane, the cyclic tetramer of beta-carbethoxypropylmethylsiloxane and the like. Illustrative of the linear carbalkoxyalkylpolysiloxanes suitable for use are the linear beta-carbethoxyethylmethylpolysiloxane, gamma-carbethoxypropylmethylpolysiloxane, delta-carbethoxybutylmethylpolysiloxane, beta-carbethoxypropylmethylpolysiloxane and the like.

Included among the linear carbalkoxyalkylpolysiloxanes suitable for use as the organosilicon starting material in my process are the alkyl and alkoxyl end-blocked polysiloxanes which contain from 1 to 3 of such groups bonded to the terminal silicon atoms of the molecules comprising the polymeric chains. Thus, I can also employ as starting materials such linear end-blocked carbalkoxyalkylpolysiloxanes as monoethoxy end-blocked gamma-carbethoxypropylethylpolysiloxane, or methyldiethoxysilyl end-blocked delta-carbethoxy butylmethylpolysiloxane or monoethoxydimethylsilyl end-blocked gamma-carbethoxypropylphenylpolysiloxanes and the like. The end-blocked linear carbalkoxyalkylalkylpolysiloxanes and carbalkoxyalkylphenylpolysiloxanes useful in my process can be prepared by processes which include the equilibration of cyclic carbalkoxyalkylalkylsiloxanes or carbalkoxyalkylarylsiloxanes with silicon compounds containing predominately silicon-bonded alkoxy groups, or by processes which include the co-hydrolysis and condensation of trialkylalkoxysilanes with carbalkoxyalkylalkyldiethoxysilanes or with carbalkoxyalkylaryldiethoxysilanes. Hydroxyl end-blocked linear polysiloxanes can also be prepared by heating linear or cyclic carbalkoxyalkylpolysiloxanes with water.

The copolymeric carbalkoxyalkylpolysiloxanes, which are also useful as starting materials, can be depicted as containing both the structural units:

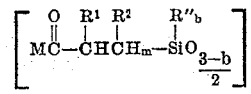
(IV)

and

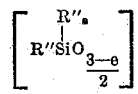
(VII)

wherein M, R″, $R^1$, $R^2$, ($m$) and ($b$) have the values described above and ($e$) is an integer having a value of from 0 to 2. The copolymers suitable for use as the organosilicon starting material in my process can contain various combined siloxane units such as trifunctional carbalkoxyalkylsiloxane unit or units (where $b=0$) with trifunctional alkyl-, aryl-, or mixed alkyl- and arylsiloxane units (where $e=0$) or with difunctional alkyl-, aryl- or mixed alkyl- and arylsiloxane units (where $e=1$). These copolymers can also contain difunctional carbalkoxyalkylsiloxane units (where $b=1$) with trifunctional alkyl-, aryl- or mixed alkyl- and arylsiloxane units (where $e=0$) or with difunctional alkyl-, aryl- or mixed alkyl- and arylsiloxane units (where $e=1$).

These copolymers which contain trifunctional carbalkoxyalkylsiloxane units are preferably prepared by processes that include the co-hydrolysis and co-condensation of a carbalkoxyalkyltrialkoxysilane starting material. Such copolymers can contain silicon-bonded alkoxy groups or they can comprise essentially completely condensed materials. The linear and cyclic copolymeric siloxanes are preferably prepared by processes that include the separate hydrolysis and condensation of a carbalkoxyalkyl-alkyldialkoxysilane or carbalkoxyalkylaryldialkoxysilane and a dialkyldialkoxysilane or a diaryldialkoxysilane to cyclic carbalkoxyalkylsiloxanes or carbalkoxyalkylarylsiloxane and cyclic dialkylsiloxanes or diarylsiloxanes and subsequently equilibrating mixtures of such cyclic siloxanes to linear copolymers. Such linear copolymers can also contain chain-terminating or end-blocking groups such as alkyl, alkoxy or hydroxyl groups.

As indicated hereinabove, the various types of starting polysiloxanes, described in detail with respect to the carbalkoxyalkylpolysiloxanes, exist for the carboxyalkylpolysiloxanes and their corresponding acid halide as well as other ester derivatives of such carboxyalkylpolysiloxanes. Thus, the trifunctional, difunctional and monofunctional carboxyalkylpolysiloxanes, as well as their acid halide and other ester derivatives, can be employed as my starting polysiloxane starting material. Illustrative of such polysiloxanes are beta-carboxyethylpolysiloxane, beta-carbethoxypropylpolysiloxane, gamma-carboxypropylpolysiloxane, the cyclic and linear beta-carboxyethylmethylpolysiloxane, the beta-carboxypropylmethylpolysiloxanes and gamma-carboxypropylpolysiloxanes and the like. Of course, the corresponding trifunctional, difunctional and monofunctional acid halide derivatives of such carboxyalkylpolysiloxanes can also be employed.

According to my experience, the monomeric carboxyalkylalkoxysilanes are not highly stable compositions of matter and, therefore, are not the preferred monomeric starting materials. However, we have found that the carboxyalkylpolysiloxanes, which can be prepared by the hydrolysis and condensation of carbalkoxyalkylalkoxysilanes under conditions which provide for the hydrolysis of both the carbalkoxy and the alkoxy groups of the monomer, to be essentially stable compositions and extremely useful starting materials in the subject process. When such carboxyalkylpolysiloxanes are employed, it is preferred that they be free of silicon-bonded hydroxyl groups.

The carbalkoxyethylalkoxysilanes, carboxyethylpolysiloxanes and their corresponding polysiloxane acid halide and ester derivatives, as well as the cyclic carboxyalkylsiloxanes, their cyclic esters and cyclic acid halide derivatives are all disclosed and claimed as new compositions of matter in copending U.S. applications Serial Nos. 615,492; 615,468, now U.S. Patent No. 2,957,899; 615,498; 615,499, now abandoned, and 627,122. Processes for producing such compounds are also disclosed and claimed in said applications.

I have found that the reaction represented by Equations I and II is generally applicable to all primary and secondary amines as well as ammonia. The compounds which are useful as the nitrogen-containing starting materials in my process are ammonia and amino compounds that may be represented by the formula:

$$RR'NH \qquad (VIII)$$

wherein R and R' have the above-defined meanings. The alkyl and aryl groups represented by R and R' in Formula VIII may be substituted or unsubstituted and when substituted the substituents may be carboxyl groups, amine groups, halogen atoms, nitro groups, alkoxy groups, carbalkoxy groups, and carbaryloxy groups.

I prefer to employ as starting materials in my process ammonia and amino compounds that are represented by Formula VIII wherein R is hydrogen, an alkyl group that contains from 1 to 5 or as high as 10 carbon atoms a phenyl group or a substituted phenyl group and R' is an alkyl group, phenyl group or substituted phenyl group as given for R. These preferred amino compounds may contain the above-mentioned substituent groups.

Ammonia may be used as a starting material in the process either in the liquid form or dissolved in water, or an aqueous ammonium hydroxide solution or dissolved or dispersed in a liquid organic compound.

Typical of the primary amines that are useful as starting materials in my process are those compounds that are represented by the formula:

$$RNH_2 \qquad (IX)$$

wherein R is an alkyl or an aryl group but preferably an alkyl group that contains from 1 to 5 or as high as 10 carbon atoms, a phenyl group or a substituted phenyl group. The group represented by R in Formula IX may contain the above-mentioned substituents. Illustrative of these primary amines are methyl amine, aniline, para-amino benzoic acid, n-butyl amine, propylene diamine and the like.

Typical of the secondary amines that are useful as starting materials in my process are those compounds that are represented by the Formula VIII wherein R and R' are alkyl or aryl groups preferably alkyl groups that contain from 1 to 5 or as high as 10 carbon atoms, a phenyl group or a substituted phenyl group. The groups represented by R and R' in such secondary amines may contain the latter-mentioned substituents. Illustrative of these secondary amines are dimethyl amine, methyl phenyl amine, diphenyl amine, phenyl ethyl amine and the like.

The process of my invention can be carried out by forming a mixture of an organosilicon compound containing the carboxyalkylsilyl grouping, or an ester, or acid halide derivative thereof, depicted above, with an amino compound and maintaining the mixture at a temperature at which the organosilicon compound and the amino compound react to produce an organosilicon compound containing a carbamyl group or substituted carbamyl group attached to a silicon atom by a polymethylene or substituted polymethylene chain containing at least two carbon atoms.

The relative amounts of the organosilicon compounds containing the carboxyalkylsilyl grouping, or the ester, or acid halide derivatives thereof, and ammonia and the amino compounds used as starting materials in my process are not narrowly critical. I can employ for each gram atom of carbon present in the carbonyl group of the

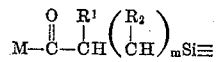

grouping of the starting organosilicon compound from 1 to 2.5 gram moles of the starting ammonia or amino compound. However, I prefer to employ for each gram atom of carbon present in the carbonyl group of the

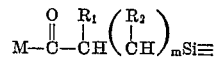

grouping of the starting organosilicon compound, from 1.5 to 2 gram moles of the starting ammonia or amino compound. Relative amounts of my starting materials other than those described can be employed; however, no commensurate advantage is gained thereby. Relatively large amounts of the amine starting material are desirable when the organosilicon starting material is the acid halide derivative of an organosilicon compound containing the carboxyalkylsilyl grouping.

The reaction between my starting compounds can be carried out at temperatures, which are not narrowly critical and which can vary over a wide range. I can employ temperatures of from as low as —10° C. to temperatures as high as 200° C.; however, I prefer to conduct the reaction at temperatures of from about 25° C. to about 200° C. Other temperatures may be used but no commensurate advantage is gained thereby. At temperatures below about —10° C. the rate of the reaction is extremely slow and at temperatures above 200° C. undesirable side reactions tend to occur.

The reaction between organosilicon compounds containing the carboxyalkylsilyl grouping, or the ester, or acid halide derivatives thereof, and ammonia and the amino compound can be carried out with a liquid organic compound in which the starting materials are mutually soluble and which is non-reactive therewith.

When carboxyalkylpolysiloxanes are used as the starting organosilicon material in producing the compounds of this invention, the liquid organic compound within which the reaction can be carried out is preferably one that is not miscible with water, although cyclic ethers and oxyalkylene compound can also be employed. Liquid organic compounds of the former type are particularly useful in separating water from the reaction mixture. Illustrative of these liquid organic compounds are petroleum ether and aromatic hydrocarbons such as benzene, toluene and xylene.

As shown above in Equation I, one of the products formed by the reaction between an organosilicon compound containing the carboxyalkylsilyl grouping and an amino compound is water which may be removed from the reaction mixture by, heating such mixture to a temperature sufficiently elevated to volatilize the water, or by adding a hydrophilic absorbent or adsorbent to the reaction mixture.

Amounts of the liquid organic compounds which can be employed as solvents for the reactants can vary over a wide range. We can employ from 10 parts to 50 parts by weight per 100 parts by weight of the organosilicon and amino compounds used as starting materials. Amounts of these liquid organic compounds other than those described above may be used; however, no commensurate advantage is gained thereby.

When an organosilicon compound that contains an acid halide derivative of a carboxyalkylsilyl grouping is used as a starting material along with an amino compound, a hydrogen halide is formed and is shown by Equation I. These hydrogen halides tend to catalyze or act as a reactant in undesirable side reactions. Tertiary amines such as pyridine, quinoline, piperdine and the like may be added to the reaction mixture to remove these hydrogen halides from the reaction mixture by combining therewith to form inert salts. Amounts of such tertiary amines of from 1 to 3 times the amount required stoichiometrically to combine with the hydrogen halide to form a salt are useful, but amounts of these amines of from 1 to 1.5 times the amount stoichiometrically required to combine with the hydrogen halide are preferred. The amount of the tertiary amine used is not narrowly critical provided that at least the stoichiometric amount is used and so other amounts may be used but no commensurate advantage is gained thereby.

When an organosilicon compound that contains an ester derivative of a carboxyalkylsilyl grouping is used as a starting material along with an amino compound, an alcohol or a phenol is formed as is shown by Equation I. The alcohol or phenol may be removed by heating the reaction mixture to a temperature sufficiently elevated to volatilize the alcohol or phenol.

Pressures lower than atmospheric may be used to aid in the removal of the water, hydrogen halide, alcohol or phenol produced as shown by Equation I. However, pressures lower than atmospheric pressure may not be desirable at times, such as when a volatile amino compound (e.g. ammonia or methyl amine) is used as a starting material. In the latter case pressures greater than atmospheric pressure may be employed to maintain the amino compound in the liquid phase.

The compounds of this invention are organosilicon compounds that contain a carbamyl or substituted carbamyl group which is linked to a silicon atom through a polymethylene or alkyl substituted polymethylene chain containing at least 2 carbon atoms. Such compounds contain the carbamyl alkylsilyl grouping which may be represented by the structural formula:

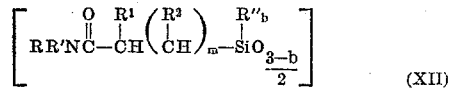
(X)

wherein R, R', R$^1$, R$^2$, and (m), have the above-described meanings.

The compounds of this invention that are produced from the ester or acid halide derivatives of carboxyalkylalkoxysilanes that are represented by structural Formula III and the amino compounds represented by Formula VIII are carbamylalkylalkoxysilanes which can be represented by the structural formulae:

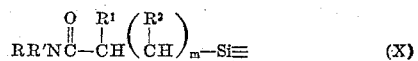
(XI)

wherein R, R', (a), R'', X and (b) have the above-described meanings. Illustrative of these carbamylalkylalkoxysilanes gamma(N - methyl)carbamylpropyltriethoxysilane, delta(N-phenyl)carbamylbutylmethyldiethoxysilane, beta(N,N-dimethyl)carbamylethyldimethylethoxysilane, beta-carbamylpropylmethyldiethoxysilane, beta-(N-butyl)carbamylpropylmethyldiethoxysilane, and the like.

The compounds of this invention that are produced from the carboxyalkylpolysiloxanes as well as the ester, and acid halide derivatives thereof that are represented by structural units depicted by structural Formula IV and the amino compounds represented by Formula VIII are carbamylalkylpolysiloxanes that contain the structural unit depicted by the structural formulae:

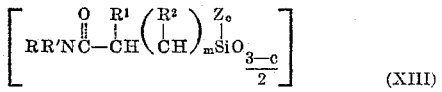
(XII)

wherein R, R', R'', R$^1$, R$^2$, (m), and (b) have the above-described meanings. Illustrative of these units are the beta(N - phenyl, N-methyl)carbamylethylmethylsiloxane units, gamma-carbamylpropylsiloxy unit, the delta(N-dimethyl)carbamylbutylmethylsiloxy unit, the delta(N-phenyl)carbamylbutyldimethylsiloxy unit, the beta-carbamylpropylmethylsiloxane units and the like.

The compounds of this invention that are produced from the carboxyalkylpolysiloxanes as well as the ester of acid halide derivatives thereof that contain the structural unit represented by structural Formula V and the amino compounds represented by Formula VIII are carbamylalkylpolysiloxanes that contain the structural unit that may be represented by the structural formulae:

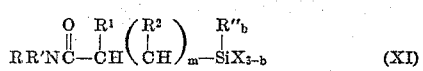
(XIII)

wherein R, R', R$^1$, R$^2$, (m), Z and (c) have the above-described meanings. Illustrative of these units are the beta(N-phenyl, N-methyl) carbamylethylhydroxysiloxane unit, gamma-carbamylpropylhydroxysiloxy unit, the delta-(N - phenyl)carbamylbutylethoxyphenylsiloxy unit and the like.

The compounds of this invention that are produced from the copolymeric carboxyalkylpolysiloxanes as well as the copolymeric ester, and acid halide derivatives that contain the structural units represented by structural Formulae IV and VII and the amino compounds represented by Formula VIII are copolymeric carbamylalkylpolysiloxanes that contain the structural units represented by structural Formulae VII and XII.

The compounds of this invention may be alternatively designated as amides rather than as substituted alkylsilanes and alkylsiloxanes as designated herein.

The compounds of the invention find use as additives for known silicone products. By way of illustration the difunctional carbamylalkylsiloxanes can be either added to or equilibrated with dimethylpolysiloxanes to form modified oils or gums. The trifunctional carbamylalkylsiloxanes can be employed themselves as thermosetting resins or they can be added to methylphenylpolysiloxanes of the thermosetting type as modifiers to improve the properties thereof. Such thermosetting resins find use as coating materials. My compounds can also be employed as adhesives and as sizing agents for fibrous materials, particularly fibrous glass materials.

The compounds of this invention, such as gamma(N-p - carbethoxyphenyl)carbamylmethylpolysiloxane were found to be useful in protecting human skin from the ultra-violet rays of the sun.

The following examples illustrate my invention.

Example I

Beta - carbethoxyethyltriethoxysilane (52.8 g., 0.2 mole) and p-aminobenzoic acid (27.4 g., 0.2 mole) were charged into a 250-ml. round bottomed flask fitted with a reflux condenser. The pot was heated by means of a heating mantle. Refluxing was conducted at a head temperature of 90° C. The refluxing was continued for 32 hours and ethanol was formed. The ethanol was then distilled off at atmospheric pressure during which time the pot temperature rose to 210° C. Eighteen cc. (0.3 mole) of ethanol was collected. A vacuum was then established in the flask to remove all the remaining volatiles.

A mixture of a thick resinous material and a crystalline material remained in the flask. The resinous material was dissolved in chloroform, the crystalline material being insoluble, and the chloroform solution was filtered. The chloroform was then removed from the solution by vacuum evaporation leaving a yellowish brown resin containing beta(N - para - carboxyphenyl)carbamylethyltriethoxysilane

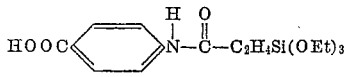

which was identified by infrared analysis of the resin. Pure beta(N - para - carboxyphenyl)carbamylethyltriethoxysilane was isolated by further precipitation of the p-aminobenzoic acid from a petroleum ether solution of the yellowish brown resin. Beta(N-para-carboxyphenyl)-carbamylethyltriethoxysilane was shown to absorb ultraviolet light in the 2600–3000 A. range and thus is useful as a sun screen agent.

*Example II*

Beta-carbethoxyethyltriethoxysilane (0.2 mole) and n-butylamine (0.2 mole) were mixed in a 500 cc. round bottomed flask fitted with a still head. The flask was then heated. A material began to reflux at 90–95° C. and the refluxing was continued for 68 hours. At the end of this time the volatile material was distilled off under reduced pressure. The distillate was 19.7 grams of ethyl alcohol and n-butylamine. Eight and eight-tenths grams of beta-carbethoxyethyltriethoxysilane was then distilled at temperatures up to 115° C. at 0.3 to 1 mm. Hg. The residue (39.0 grams) had a refractive index ($n_D^{25}$) of 1.4362 and was shown to be beta(N-n-butyl)carbamylethyltriethoxysilane by its infrared absorbtion.

*Example III*

Aniline (0.2 mole) and beta-carbethoxyethyltriethoxysilane mixed in a 500 cc. round bottomed flask fitted with a still head. The flask was then heated until the temperature in the flask was 200° C. Some refluxing started almost immediately. The refluxing material was distilled off as it was formed in the still head. The material in the flask was heated for two days at 200° C. The material in the flask was then allowed to stand one month at room temperature. The material was then stripped under vacuum at 160° C. to remove unreacted starting material. There was obtained 18.2 grams of a residue. The residue was shown to contain beta-(N-phenyl)carbamylethyltriethoxysilane

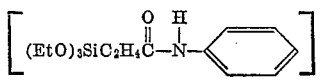

by infrared analysis.

*Example IV*

Gamma - carbethoxypropylmethyldiethoxysilane (0.1 mole) and propylenediamine (0.1 mole) were mixed in a 100 cc. round bottomed flask and allowed to stand at room temperature. The reactants were immiscible upon mixing and after one day, the mixture was completely miscible. After standing 72 hours at room temperature the reaction materials were heated to 160° C. under vacuum (less than 1 mm.) to distill off the unreacted starting materials. The residue weighed 2.0 grams, was shown to contain gamma - (N-3-aminopropyl)carbamylpropylmethyldiethoxysilane

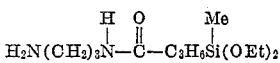

by infrared analysis.

*Example V*

Gamma - carbethoxypropylmethyldiethoxysilane was placed in a stainless steel pressure vessel along with 10 cc. of liquid ammonia. The vessel was sealed, placed in a rocking heater and rocked with heating to 185° C. for four hours. The vessel was opened and the liquid contents poured into a distilling flask. The vessel was washed with toluene and the toluene was placed in the flask. The toluene was distilled off under reduced pressure and the unreacted gamma-carbethoxypropylmethyldiethoxysilane was recovered by vacuum stripping (less than 1 mm.) at 160° C. The residue in the flask weighed 2.4 grams and was shown by infrared analysis to be gamma-carbamylpropylmethyldiethoxysilane

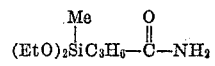

*Example VI*

A trimethylsiloxy end-blocked dimethylpolysiloxane oil having a molecular weight of about 5000, and which contained 30 parts by weight of combined gamma-carboxypropylmethylsiloxane units and 70 parts by weight of combined dimethylsiloxane units per 100 parts by weight of the oil was dissolved in and 50:50 ether-toluene mixture (200 ml.) and 30 cc. of a 28 wt. percent aqueous ammonium hydroxide solution added with stirring. The mixture was allowed to stand at room temperature for 1 hour and the solvent was then removed under reduced pressure (1.0 mm.) as the temperature rose to 100° C. Infrared analysis confirmed the presence of the

group, and unreacted —COOH bands. The above product (20 g.) was therefore dissolved in acetone (50 cc.) and 20 cc. of a 28 wt. percent aqueous ammonium hydroxide solution was added. The resulting mixture was allowed to stand at room temperature for 4 hours. Toluene (100 cc.) was then added and the unreacted ammonium hydroxide, water, and solvents removed by stripping under reduced pressure (1.0 mm.) up to a temperature of 100° C. A brown, viscous oil that weighed 18.4 grams was obtained,. This brown viscous oil was a trimethylsiloxy end-blocked dimethylpolysiloxane oil that contained combined gamma-carbamylpropylmethylsiloxane units and combined dimethylsiloxane units. The infrared spectrum of the brown-viscous oil exhibited absorption due to

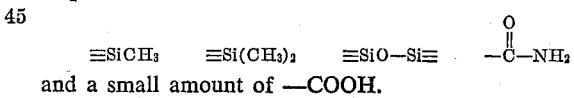

and a small amount of —COOH.

*Example VII*

Silicone oils containing carbamyl groups can also be prepared by treatment of the carboxy-modified oil with thionyl chloride to prepare the acid chloride, followed by treatment with ammonia. Using this technique a trimethylsiloxy end-blocked dimethylpolysiloxane oil that contained combined gamma-carbamylpropylmethylsiloxane units and combined dimethylsiloxane units was prepared from a trimethylsiloxy end-blocked dimethylpolysiloxane oil that had a molecular weight of 5000, and that contained 10 parts by weight of combined gamma-carboxypropylmethylsiloxane units and 90 parts by weight of combined dimethylsiloxane units per 100 parts by weight of the copolymer.

*Example VIII*

One hundred grams of a trimethylsiloxy end-blocked dimethylpolysiloxane oil containing 30 parts by weight of combined gamma - carbethoxypropylmethylsiloxane units and 25 parts by weight of combined gamma-carboxypropylmethylsiloxane units and 45 parts by weight of combined dimethylsiloxane units per 100 parts by weight of the oil was placed in a 500 cc. flask and ethylene diamine (30.5 g.) was added. The mixture was stirred at room temperature for 4 hours and then allowed to stand at room temperature for two weeks. The product so obtained was not soluble in ethyl ether (200 cc.) or a mixture of ether (200 cc.) and toluene (150 cc.). Unreacted ethylene diamine, toluene and ether were then removed at room temperature under reduced pressure (1.0 mm.). A sample of the residual oil so produced was vacuum dried at 95° C. Infrared analysis showed the residual oil to contain ≡NH, —OH, ≡COOH,

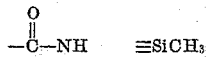

≡Si(CH₃)₂ and ≡Si—O—Si≡ linear bonds. No ethylene diamine could be detected. The residual oil was a trimethylsiloxy end-blocked dimethylpolysiloxane oil that contained combined gamma-(N-2-aminoethyl)carbamylpropylmethylsiloxane units, gamma-carboxypropylmethylsiloxane units and combined dimethylsiloxane units.

*Example IX*

Beta-carbethoxyethyltriethoxysilane (0.2 mole) and p-aminobenzoic acid (0.2 mole) were heated, in a flask fitted with a still head, to a temperature of 150° C. Ethanol began to reflux and the refluxing was continued for thirty-two (32) hours. The ethanol was then distilled off and the residue was vacuum stripped at 150–200° C. The resulting product was dissolved in chloroform, filtered and then stripped of chloroform to yield beta-(N-para-carboxyphenyl)carbamylethyltriethoxysilane which was a viscous resin-like material. This material proved to be an excellent ultraviolet absorber in the 2600 to 3100 A. range. The percent transmission through a solution containing 0.041 gram per liter of the product in ethanol is given below.

| Wavelength (A.): | Percent transmission |
|---|---|
| 2600 | 16.5 |
| 2700 | 7.0 |
| 2800 | 4.0 |
| 2900 | 4.0 |
| 3000 | 5.5 |
| 3100 | 14.5 |

*Example X*

Bis - (trimethylsiloxy)methyl - beta - carboxypropylsilane prepared by sulfuric acid equilibration of hexamethyldisiloxane and beta-carboxypropylmethylsiloxane was treated with thionyl chloride to yield the acid chloride

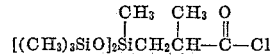

The acid chloride above (31.5 g.) was added dropwise with vigorous stirring to a 1 liter three necked flask containing 60 g. of ethyl-p-aminobenzoate dissolved in 200 cc. of anhydrous dimethyl "Cellosolve." The addition took ½ hour and the stirring was continued for an additional 1½ hours. A slight rise in temperature was noted during the addition. Water (200 cc.) was added and the silicone extracted with diethylether. The ether solution was washed three times with 15% hydrochloric acid to remove the unreacted ethyl-p-aminobenzoate. The ether solution was then washed with distilled water until the washings were free of chloride ion (AgNO₃ test).

The ether was evaporated off and toluene (150 cc.) added. The toluene and any residual water was removed by vacuum stripping at 100° C. for 2 hours.

A thick viscous brown oil (bis-(trimethylsiloxy) methyl - beta(N - p - carbethoxyphenyl)carbamylpropylsilane) was recovered.

Infrared spectral analysis of the oil gave absorption bands indicating the presence of

   

and

structures.

A sample of the material was dissolved in ethanol to give a concentration of 0.048 g./liter and was tested for ultraviolet absorption in a cell of 1 cm. light path with the following results:

| Wavelength, A.: | Percent transmission |
|---|---|
| 2500 | 7.3 |
| 2600 | 0.75 |
| 2700 | 0.083 |
| 2740 | 0.063 |
| 2800 | 0.09 |
| 2900 | 0.51 |
| 3000 | 24. |

The absorption of the ultraviolet rays of the wave length above indicates that the material is useful as a sun screen agent in suntan formulations.

*Example XI*

*Step A.*—A 1000 molecular weight dimethyl silicone oil (50 g.) (containing about 3

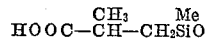

units per molecule) was charged into a 250 ml. round-bottomed flask and thionyl chloride (36.2 g.) added with shaking. After the reaction solution was allowed to stand overnight at room temperature, protected from atmospheric moisture by a drying tube filled with anhydrous calcium sulfate, the excess thionyl chloride was removed by vacuum stripping at 40° C. for 1½ hours. A free flowing oil containing acid chloride groups (49.9 g.) tan in color, was obtained.

*Step B.*—Ethyl-p-aminobenzoate (60 g.) was dissolved in 250 cc. of anhydrous dimethyl "Cellosolve" and charged into a 1 liter 3-necked flask fitted with a dropping funnel and a motor-driven stirrer.

The oil from Step A was dissolved in 100 cc. of anhydrous dimethyl "Cellosolve" and charged into the dropping funnel. The solution of the oil was added slowly (over one-half hour period) to the ethyl-p-aminobenzoate solution. The solution turned cloudy and was stirred for an additional 2 hours. Distilled water 200 cc. was then added and the silicone extracted with diethyl ether. The ether solution was washed three times with 15 percent HCl and then with distilled water until the water washings were free of chloride (AgNO₃ test). The ether was evaporated off and toluene (200 cc.) added. The toluene and any residual water was then removed by vacuum stripping for 2 hours at 80° C.

A brown viscous dimethylsilicone oil (62 g.) containing about 3 beta(N-p-carbethoxyphenyl)carbamylpropylmethylsiloxy groups per molecule was obtained.

The oil gave the following absorption in the ultraviolet spectrum when run in ethanol solution at a concentration of 0.021 g./liter in a cell of 1 cm. light path:

| Wave Length, A. | Optical Density | Percent Transmission |
|---|---|---|
| 2,500 | .43 | 37.1 |
| 2,600 | .76 | 17.4 |
| 2,700 | 1.08 | 8.3 |
| 2,730 | 1.12 | 7.6 |
| 2,800 | 1.05 | 8.9 |
| 2,900 | .75 | 17.8 |
| 3,000 | .20 | 63.1 |

The absorption of the ultraviolet rays of the above wave length shows that the material is useful as a sun screen agent in suntan formulations.

*Example XII*

Fifty grams of a dimethyl-silicone oil (mol. wt. 832) containing three beta-carboxypropylmethylsiloxy units per molecule was charged into a 250 ml. round-bottomed flask and thionyl chloride (36 g.) was added with shaking. The reaction solution was then allowed to stand overnight at room temperature, protected from moisture by a drying tube filled with anhydrous calcium sulfate. The excess thionyl chloride was then removed by vacuum stripping at 40° C. for 1½ hours. A tan free flowing oil (49 g.) resulted.

Ethyl-p-aminobenzoate (62 g.) was dissolved in 150 cc. of dry dimethyl "Cellosolve" and charged into a 1 liter, three-necked, round-bottomed flask fitted with a motor-driven stirrer.

The modified silicone oil (49 g.) above was dissolved in dimethyl "Cellosolve" (75 cc.) and charged into a dropping funnel. The oil was added slowly (½ hour) with stirring to the ethyl-p-aminobenzoate solution. A slight rise in temperature was noted and solution became cloudy. The reaction mixture was then stirred for an additional 2 hours.

Water (200 cc.) was added and the silicone extracted with diethyl ether (approx. 300 cc.). The ether solution was washed three times with 15 percent HCl and then with distilled water until the water washings were free of chloride ions (AgNO$_3$ test). The ether was evaporated off and toluene (200 cc.) was added. The toluene and any residual water was removed by vacuum stripping at 80° C. for 2 hours.

A low melting solid (66 g.), trimethylsiloxy-endblocked silicone oil containing about 3 dimethylsiloxy units and about 3 beta(N-p-carbethoxyphenyl)carbamylpropylmethylsiloxy units, remained.

This material gave the following absorption in the ultra-violet spectrum:

| Wave Length, A. | Optical Density | Percent Transmission |
| --- | --- | --- |
| 2,500 | .57 | 27. |
| 2,600 | 1.12 | 7.5 |
| 2,700 | 1.64 | 2.3 |
| 2,730 | 1.68 | 2.1 |
| 2,800 | 1.58 | 2.62 |
| 2,900 | 1.15 | 7.05 |
| 3,000 | .24 | 57.6 |

Sample run in ethanol solution 0.035 g./liter in a cell of 1 cm. light path.

*Example XIII*

To a stainless steel pressure vessel was charged 62 g. (0.25 mole) of EtOOCCH(CH$_3$)CH$_2$Si(CH$_3$)(OEt)$_2$, 42.5 g. (2.5 mole) of liquid ammonia and 50 ml. of isopropyl ether. The vessel was sealed and heated at 185° C. for 7 hrs. with rocking. After cooling the solution was concentrated under reduced pressure and the residue distilled through a column packed with "Hastelloy B" metal packing. A fraction, 4.7 g., B.P. 140° C. (0.2 mm.) −150° C. (0.3 mm.), was shown by infra-red to contain beta-carbamylpropylmethyldiethoxysilane

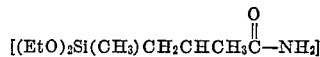

along with some ester.

Analytical results: Theory, Si, 12.7. Found, Si, 13.5.

*Example XIV*

Beta-carbethoxypropylmethyldiethoxysilane (74.4 g., 0.3 mole), n-butylamine (21.9 g., 0.3 mole), and ammonium chloride (0.3 g.) were charged to a 250 cc. round bottomed flask fitted with a reflux condenser and protected from atmospheric moisture by a calcium sulfate drying tube. The reaction mixture was heated at reflux (pot temp. 100-112° C.) for 40 hours during which time the solution turned from light yellow to reddish brown. The solution was cooled and then distilled rapidly through a Vigreaux column and gave 9.5 g. of material, B.P. 107° (2.7 mm.) −128° (0.7 mm.). This fraction was redistilled to give beta(N-n-butyl)carbamylpropylmethyldiethoxysilane

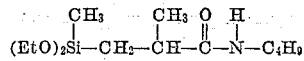

(B.P. 114° C.-117° C. at 0.6 mm. Hg $n_D^{25}$ 1.4385). The structure was verified by infrared analysis and gave the following chemical analysis.

Calculated for: C$_{13}$H$_{29}$SiNO$_3$ N, 5.09%; Si 10.2%. Found: N, 3.4%; Si 11.2%.

What is claimed is:

1. As a new composition of matter carbamylalkylsilicon compounds selected from the class consisting of (1) carbamylalkylsilanes of the formula:

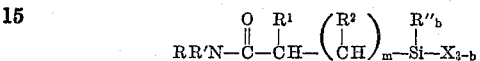

wherein R is a member selected from the group consisting of hydrogen atoms, alkyl groups and aryl groups, R' is a member selected from the group consisting of alkyl groups, aryl groups and alkyl and aryl groups substituted with a member of the class consisting of hydroxy groups, nitro groups, alkoxy groups, carboxyl groups, carbalkoxy groups, carbaryloxy groups and halogen atoms, R'' is a member selected from the group consisting of alkyl groups and aryl groups, R$^1$ and R$^2$ are members selected from the group consisting of the hydrogen atom and alkyl groups, X is an alkoxy group, (m) is an integer having a value of at least 1 and (b) is an integer having a value of from 0 to 2, (2) carbamylalkylsilanes of the formula:

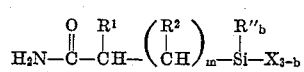

wherein R'', R$^1$, R$^2$, X, (b) and (m) are as above defined, (3) carbamylalkylsiloxane polymers containing units of the formula:

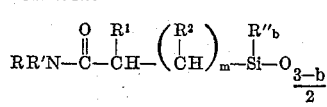

wherein R, R', R'', R$^1$, R$^2$, (m) and (b) are as above defined, and (4) carbamylalkylsiloxane copolymers containing at least one unit of the formula:

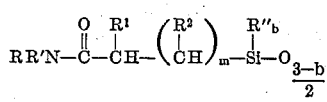

and at least one unit of the formula:

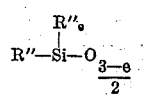

wherein R, R', R'', R$^1$, R$^2$, (m) and (b) are as above defined and (e) is an integer of from 0 to 2.

2. Carbamylalkylalkoxysilanes of the formula:

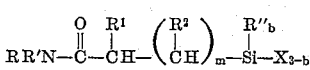

wherein R is a member selected from the group consisting of hydrogen atoms, alkyl groups and aryl groups, R' is a member selected from the group consisting of alkyl groups, aryl groups and alkyl and aryl groups substituted with a member of the class consisting of hydroxy groups, nitro groups, alkoxy groups, carboxyl groups, carbalkoxy groups, carbaryloxy groups and halogen atoms; R'' represents a member selected from the group consisting of alkyl groups and aryl groups, R$^1$ and R$^2$ are members selected from the group consisting of the hydrogen atom and alkyl groups, X is an alkoxy group, (m) represents an integer having a value of at least 1, and (b) is an integer having a value of from 0 to 2.

3. Carbamylalkylalkoxysilanes of the formula:

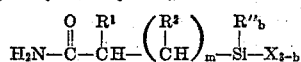

wherein R″ is a member selected from the group consisting of alkyl groups and aryl groups, $R^1$ and $R^2$ are members selected from the group consisting of the hydrogen atom and alkyl groups, X is an alkoxy group, (b) is an integer having a value of from 0 to 2, and (m) is an integer having a value of at least 1.

4. Carbamylalkyl-containing siloxane polymers containing units of the formula:

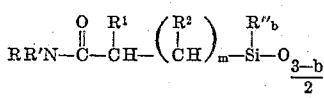

wherein R is a member selected from the group consisting of hydrogen atoms, alkyl groups and aryl groups, R′ is a member selected from the group consisting of alkyl groups, aryl groups and alkyl and aryl groups substituted with a member of the class consisting of hydroxy groups, nitro groups, alkoxy groups, carboxyl groups, carbalkoxy groups and carbaryloxy groups and halogen atoms, R″ is a member selected from the group consisting of alkyl groups and aryl groups, $R^1$ and $R^2$ are members selected from the group consisting of the hydrogen atom and alkyl groups, (m) is an integer having a value of at least 1 and (b) is an integer having a value of from 0 to 2.

5. Carbamylalkyl-containing polysiloxane copolymers containing at least one unit of the formula:

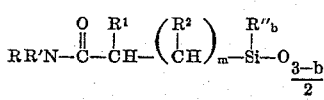

and at least one unit of the formula:

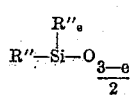

wherein R is a member selected from the group consisting of hydrogen atoms, alkyl groups and aryl groups, R′ is a member selected from the group consisting of alkyl groups, aryl groups and alkyl and aryl groups substituted with a member of the class consisting of hydroxy groups, nitro groups, alkoxy groups, carboxyl groups, carbalkoxy groups, carbaryloxy groups and halogen atoms, R″ is a member selected from the group consisting of alkyl groups and aryl groups, $R^1$ and $R^2$ are members selected from the group consisting of the hydrogen atom and alkyl groups, (m) is an integer having a value of at least 1, (b) is an integer having a value of from 0 to 2 and (e) is an integer of from 0 to 2.

6. Beta - (N - para - carboxyphenyl)carbamylethyltriethoxysilane.

7. Beta-(N-n-butyl)carbamylethyltriethoxysilane.

8. Beta-(N-phenyl)carbamylethyltriethoxysilane.

9. Gamma-carbamylpropylmethyldiethoxysilane.

10. Beta-carbamylpropylmethyldiethoxysilane.

11. Bis - trimethylsiloxy - beta - (N - para - carbethoxyphenyl)carbamylpropylmethylsilane.

12. Beta - (N - n - butyl)carbamylpropylmethyldiethoxysilane.

13. A trimethylsiloxy end-blocked dimethylsiloxane oil containing beta - (N - para - carbethoxyphenyl)carbamylpropylmethylsiloxy units.

14. A trimethylsiloxy end-blocked dimethylsiloxane oil containing gamma-(N-para-carbethoxyphenyl)carbamylpropylmethylsiloxy units.

15. A trimethylsiloxy end-blocked dimethylpolysiloxane oil containing combined gamma-(N-2-aminoethyl)carbamylpropylmethylsiloxane units, gamma-carboxypropylmethylsiloxane units and dimethylsiloxane units.

16. A process for producing an organosilicon compound that contains a carbamylalkylsilyl group of the formula:

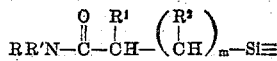

wherein R is a member selected from the group consisting of the hydrogen atom, alkyl groups and aryl groups, and R′ is a member selected from the group consisting of alkyl groups, aryl groups and alkyl and aryl groups substituted with a member of the class consisting of hydroxy groups, nitro groups, alkoxy groups, carboxyl groups, carbalkoxy groups, carbaryloxy groups and halogen atoms, (m) is an integer that has a value of at least 1, $R^1$ and $R^2$ are members selected from the group consisting of the hydrogen atom and alkyl groups and the silicon atom is connected to at least one member of the class consisting of alkoxy groups and silicon through silicon to oxygen to silicon linkage, and each remaining unfilled valence of silicon being satisfied by a member of the class consisting of aryl groups, alkoxy groups and silicon through silicon to oxygen to silicon linkage, which comprises forming a mixture of an organosilicon compound that contains the grouping which is represented by the structural formula:

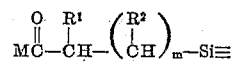

wherein (m), $R^1$ and $R^2$ have the above-defined values, and M is a member selected from the group consisting of the halogen atoms, the hydroxyl group, and the —OR″ group, wherein R″ is a member selected from the group consisting of the alkyl and aryl groups, and the free valences of Si are connected as defined above, and an amino compound that is represented by the structural formula:

RR′NH wherein R and R′ have the above-defined meanings, and maintaining the mixture at a temperature at which the organosilicon compound containing the group:

and the amino compound react to produce the organosilicon compound that contains the carbamylalkylsilyl grouping.

17. A process as claimed in claim 16 wherein the reaction is carried out in the presence of an inert liquid organic solvent.

18. A process for producing a carbamylalkylsilane of the formula:

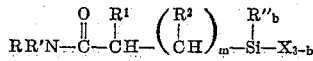

wherein R is a member of the class consisting of hydrogen, alkyl groups and aryl groups, R′ is a member of the class consisting of alkyl groups, aryl groups and alkyl and aryl groups substituted with a member of the class consisting of hydroxy groups, nitro groups, alkoxy groups, carboxyl groups, carbalkoxy groups, carbaryloxy groups and halogen atoms, R″ is a member of the class consisting of alkyl and aryl groups, $R^1$ and $R^2$ are members of the class consisting of hydrogen and alkyl groups, X is an alkoxy group, (m) is an integer having a value of at least 1 and (b) is an integer having a value of from 0 to 2, which comprises forming a mixture of a silicon compound of the formula:

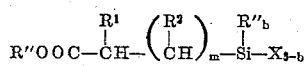

wherein $R^1$, $R^2$, R″, X, (b) and (m) have the above-defined meanings and R″ is a member of the class consisting of alkyl and aryl groups and an amino compound that is represented by the formula:

RR′NH wherein R and R′ have the above maintaining the mixture at a temperature at which the silicon compound and the amino compound react to produce the carbamylalkylsilane.

19. A process for producing an organosiloxane of the formula:

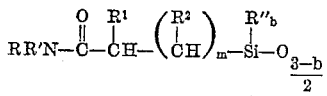

wherein R is a member of the class consisting of hydrogen, alkyl groups and aryl groups, R' is a member of the class consisting of alkyl groups, aryl groups and alkyl and aryl groups substituted with a member of the class consisting of hydroxy groups, nitro groups, alkoxy groups, carboxyl groups, carbalkoxy groups, carbaryloxy groups and halogen atoms, R'' is a member of the class consisting of alkyl and aryl groups, $R^1$ and $R^2$ are members of the class consisting of hydrogen and alkyl groups, ($m$) is an integer having a value of at least 1, and ($b$) is an integer having a value of from 0 to 2, which comprises forming a mixture of a siloxane of the formula:

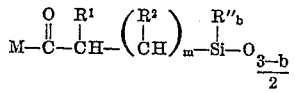

where R'', $R^1$, $R^2$, ($b$) and ($m$) are as above-defined and M is a member of the class consisting of halogen, hydroxyl groups, alkoxy and aryloxy groups and an amino compound that is represented by the formula:

wherein R and R' have the above-defined meanings, and maintaining the mixture at a temperature at which the silicon compound and the amino compound react to produce the carbamylalkylorganosiloxane.

20. A process for producing copolymeric organo-siloxanes containing at least one unit of the formula:

(1) 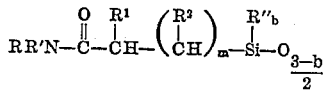

wherein R is a member selected from the group consisting of the hydrogen atom, alkyl groups, and aryl groups, R' is a member selected from the group consisting of alkyl groups, aryl groups and alkyl and aryl groups substituted with a member of the class consisting of hydroxy groups, nitro groups, alkoxy groups, carboxyl groups, carbalkoxy groups, carbaryloxy groups and halogen atoms, R'' is a member of the class consisting of alkyl and aryl groups, $R^1$ and $R^2$ are members selected from the group consisting of the hydrogen atom and alkyl groups, ($m$) is an integer that has a value of at least 1 and ($b$) is an integer having a value of from 0 to 2 and at least one unit of the formula:

(2) 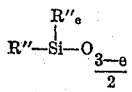

wherein R'' has the above-defined meaning and ($e$) is an integer of from 0 to 2, which comprises forming a mixture of a siloxane containing at least one unit of the Formula 2 and at least one unit of the formula:

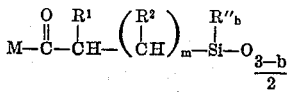

wherein ($b$), ($m$), R'', $R^1$ and $R^2$ have the above-defined values, and M is a member selected from the group consisting of the halogen atoms, the hydroxyl group, and the —OR'' group, wherein R'' is as above defined and of an amino compound that is represented by the formula:

wherein R and R' have the above-defined meanings, and maintaining the mixture at a temperature at which the organosiloxane and the amino compound react to produce said copolymeric organosiloxane.

References Cited in the file of this patent

UNITED STATES PATENTS

| | | |
|---|---|---|
| 2,610,198 | Sommer | Sept. 9, 1952 |
| 2,723,987 | Speier | Nov. 15, 1955 |
| 2,763,675 | Prochaska | Sept. 18, 1956 |
| 2,819,245 | Shorr | Jan. 7, 1958 |
| 2,838,423 | Gilkey | June 10, 1958 |
| 2,855,381 | Sommer | Oct. 7, 1958 |

FOREIGN PATENTS

| | | |
|---|---|---|
| 788,984 | Great Britain | Jan. 8, 1958 |

UNITED STATES PATENT OFFICE
CERTIFICATION OF CORRECTION

Patent No. 2,973,383                 February 28, 1961

William T. Black

It is hereby certified that error appears in the above numbered patent requiring correction and that the said Letters Patent should read as corrected below.

Column 1, line 60, equation (I), for that portion reading "R' N+" read -- RR' NH+ --; column 2, lines 16 to 18, formula (III) should appear as shown below instead of as in the patent:

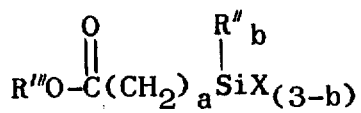

column 4, lines 25 to 29, formula (IV) should appear as shown below instead of as in the patent:

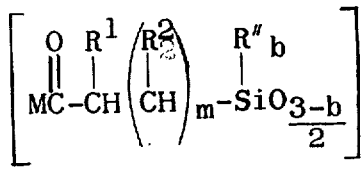

column 8, line 19, for "of" read -- and --; column 9, line 34, for "absorbtion" read -- absorption --.

Signed and sealed this 19th day of June 1962.

(SEAL)
Attest:

ERNEST W. SWIDER
Attesting Officer

DAVID L. LADD
Commissioner of Patents